(12) United States Patent
Cudak et al.

(10) Patent No.: US 9,843,684 B1
(45) Date of Patent: Dec. 12, 2017

(54) USING A CONVERSATION CONTEXT TO MANAGE CONFERENCE PARTICIPANTS

(71) Applicant: LENOVO ENTERPRISE SOLUTIONS (SINGAPORE) PTE. LTD., Singapore (SG)

(72) Inventors: Gary D. Cudak, Wake Forest, NC (US); Joseph F. Herman, Jr., Raleigh, NC (US); Shareef F. Alshinnawi, Apex, NC (US); J. Mark Weber, Wake Forest, NC (US)

(73) Assignee: Lenovo Enterprise Solutions (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 15/262,512

(22) Filed: Sep. 12, 2016

(51) Int. Cl.
*H04M 1/64* (2006.01)
*H04M 3/56* (2006.01)
*H04L 12/18* (2006.01)
*G06Q 10/10* (2012.01)
*H04M 3/42* (2006.01)

(52) U.S. Cl.
CPC ........ *H04M 3/568* (2013.01); *G06Q 10/1093* (2013.01); *H04L 12/1818* (2013.01); *H04M 3/42221* (2013.01)

(58) Field of Classification Search
CPC ........ H04M 3/56; H04M 3/567; H04M 3/568; H04M 3/42221; H04M 3/563; H04M 2201/40; H04M 7/006; H04M 2201/60; H04M 2203/5027; H04M 2207/12; H04M 3/436; H04M 3/51; H04M 3/54; H04M 3/565; H04M 7/001; H04M 2203/5018; H04M 2203/5063; H04M 3/562; H04M 3/564; H04L 1/0027

USPC ............. 379/202.01, 93.01, 142.17, 204.01, 379/211.02, 85, 142.01, 142.04, 142.07, 379/201.03, 206.01, 207.13, 67.1, 87, 379/93.21, 88.01, 416
See application file for complete search history.

(56) References Cited

U.S. PATENT DOCUMENTS

| | | | |
|---|---|---|---|
| 6,810,116 B1 * | 10/2004 | Sorensen | H04M 3/56 379/202.01 |
| 6,853,716 B1 * | 2/2005 | Shaffer | H04M 3/56 370/260 |
| 6,978,001 B1 * | 12/2005 | Shaffer | H04L 29/06 370/260 |

(Continued)

*Primary Examiner* — Akelaw Teshale
(74) *Attorney, Agent, or Firm* — Brandon C. Kennedy; Jason A. Friday; Kennedy Lenart Spraggins LLP (57) ABSTRACT

Using a conversation context to manage conference participants including receiving a request from an invitee to join a conference in progress; extracting audio from the conference; converting said audio to data describing the conference; matching data to a context, wherein the context comprises a specification of a subject matter of the conference and a list of authorized participants for the conference; comparing the invitee to the list of the authorized participants for the conference; responsive to determining that the invitee matches an authorized participant of the list of authorized participants for the conference, granting permission to the invitee to join the conference; and responsive to determining that the invitee does not match an authorized participant of the list of authorized participants for the conference, denying the invitee access to the conference.

20 Claims, 7 Drawing Sheets

(56) References Cited

U.S. PATENT DOCUMENTS

| | | | | |
|---|---|---|---|---|
| 7,133,512 B2* | 11/2006 | Creamer | ............... | H04M 3/493 348/14.08 |
| 2005/0015444 A1* | 1/2005 | Rambo | ................... | H04N 7/15 709/204 |
| 2007/0206759 A1* | 9/2007 | Boyanovsky | ..... | H04M 3/42221 379/202.01 |
| 2008/0181140 A1* | 7/2008 | Bangor | ................ | H04L 65/403 370/261 |
| 2013/0251132 A1* | 9/2013 | Manor | ................ | H04L 12/1822 379/202.01 |
| 2013/0263216 A1* | 10/2013 | Vakil | ....................... | G06F 21/31 726/3 |
| 2014/0019536 A1* | 1/2014 | Christensen | ........... | G06Q 10/10 709/204 |
| 2016/0219435 A1* | 7/2016 | Mistry | ................. | H04W 12/06 |

* cited by examiner

USING A CONVERSATION CONTEXT TO MANAGE CONFERENCE PARTICIPANTS

BACKGROUND

Field of the Invention

The field of the invention is data processing, or, more specifically, methods, apparatus, and products for using a conversation context to manage conference participants.

Description of Related Art

Multi-user communication software, such as group chats and conference calls, are widely used to exchange information and solve problems. Such calls are often overlap and, in many cases, include different groups of participants covering different topics.

SUMMARY

Methods, systems, and apparatus for using a conversation context to manage conference participants are disclosed in this specification. Using a conversation context to manage conference participants includes receiving a request from an invitee to join a conference in progress; extracting audio from the conference; converting said audio to data describing the conference; matching data to a context, wherein the context comprises a specification of a subject matter of the conference and a list of authorized participants for the conference; comparing the invitee to the list of the authorized participants for the conference; responsive to determining that the invitee matches an authorized participant of the list of authorized participants for the conference, granting permission to the invitee to join the conference; and responsive to determining that the invitee does not match an authorized participant of the list of authorized participants for the conference, denying the invitee access to the conference.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
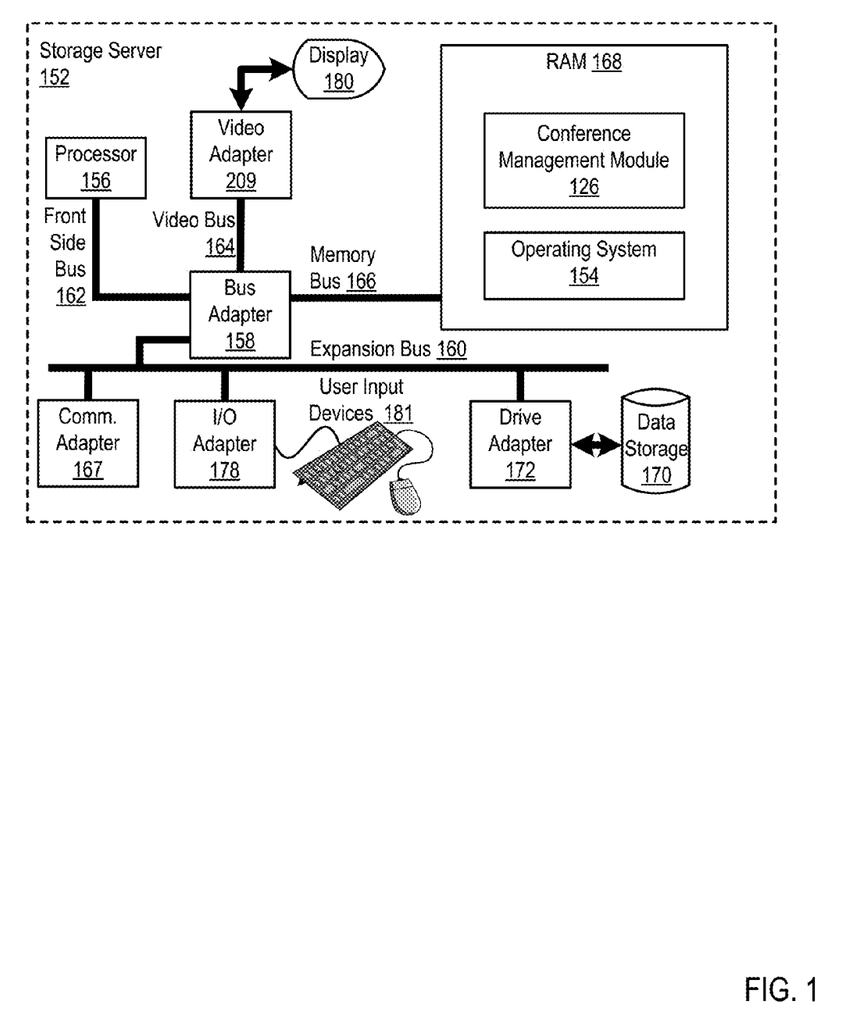
FIG. 1 sets forth a block diagram of an example system configured for using a conversation context to manage conference participants according to embodiments of the present invention.

Exemplary methods, apparatus, and products for using a conversation context to manage conference participants in accordance with the present invention are described with reference to the accompanying drawings, beginning with FIG. 1. FIG. 1 sets forth a block diagram of automated computing machinery comprising an exemplary computing system (152) configured for using a conversation context to manage conference participants according to embodiments of the present invention. The computing system (152) of FIG. 1 includes at least one computer processor (156) or 'CPU' as well as random access memory (168) (RAM') which is connected through a high speed memory bus (166) and bus adapter (158) to processor (156) and to other components of the computing system (152).

Stored in RAM (168) is an operating system (154). Operating systems useful in computers configured for using a conversation context to manage conference participants according to embodiments of the present invention include UNIX™, Linux™, Microsoft XP™, AIX™, IBM's i5/OS™, and others as will occur to those of skill in the art. The operating system (154) in the example of FIG. 1 is shown in RAM (168), but many components of such software typically are stored in non-volatile memory also, such as, for example, on a disk drive (170). Also stored in RAM (168) and executing within the operating system is the conference management module (126), a module of computer program instructions for using a conversation context to manage conference participants.

The computing system (152) of FIG. 1 includes disk drive adapter (172) coupled through expansion bus (160) and bus adapter (158) to processor (156) and other components of the computing system (152). Disk drive adapter (172) connects non-volatile data storage to the computing system (152) in the form of disk drive (170). Disk drive adapters useful in computers configured for using a conversation context to manage conference participants according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computing system (152) of FIG. 1 includes one or more input/output ('I/O') adapters (178). I/O adapters implement user-oriented input/output through, for example, software drivers and computer hardware for controlling output to display devices such as computer display screens, as well as user input from user input devices (181) such as keyboards and mice. The example computing system (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computing system (152) of FIG. 1 includes a communications adapter (167) for data communications with other computers (182) and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for using a conversation context to manage conference participants according to embodiments of the present invention include modems for wired dial-up communications, Ethernet (IEEE 802.3) adapters for wired data communications, and 802.11 adapters for wireless data communications.

Figure 2:
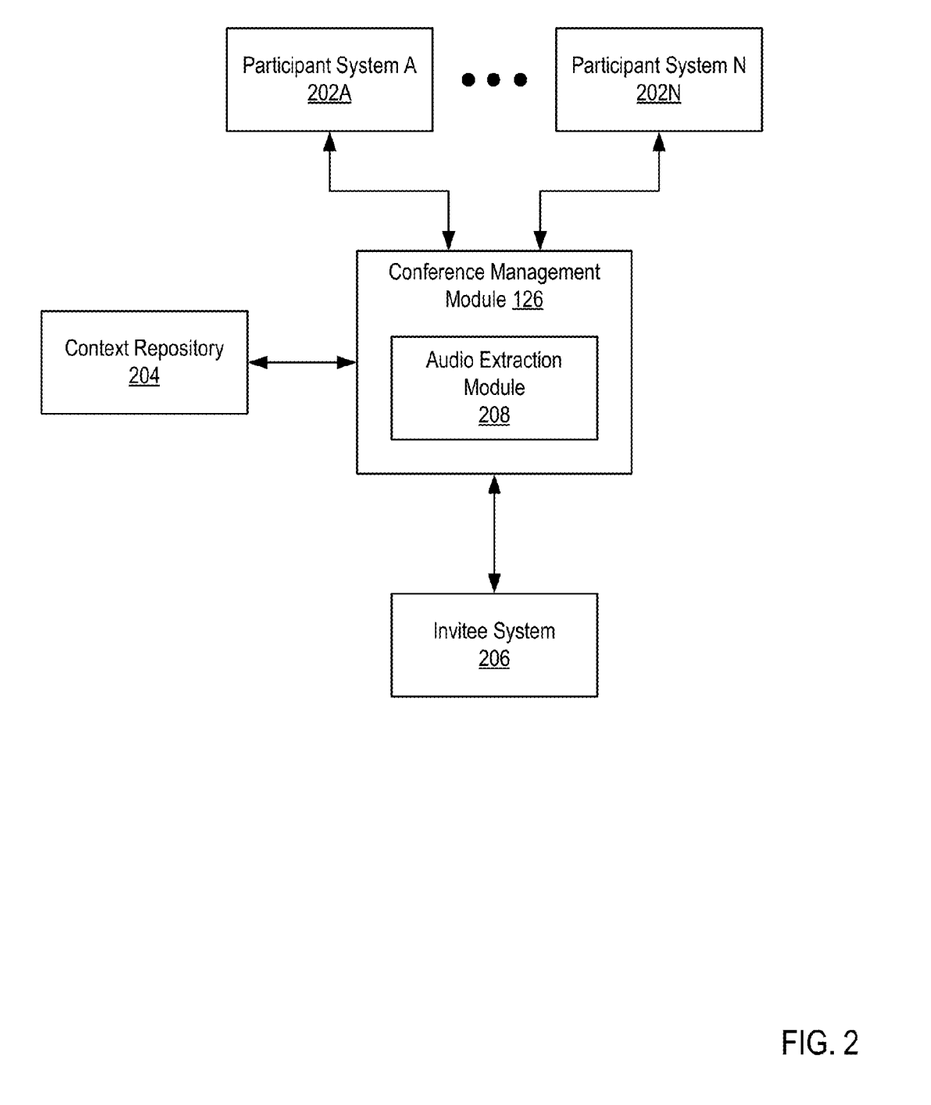
FIG. 2 sets forth a block diagram for using a conversation context to manage conference participants according to embodiments of the present invention.

FIG. 2 is an example block diagram of a system configured for using a conversation context to manage conference participants. FIG. 2 includes multiple participant systems (participant system A (202A), participant system N (202N)), a conference management module (126) that includes an audio extraction module (208), a context repository (204), and an invitee system (206).

The participant systems (participant system A (202A), participant system N (202N)) are computing systems or other communications devices communicatively coupled to the conference management module (126). Each participant system (participant system A (202A), participant system N (202N)) accesses a conference using an identifier that identifies or describes the person or entity accessing a conference hosted by the conference management module (126). The identifier may be, for example, a phone number, a user name, an internet address, an email address, or a conference access code.

The invitee system (206) is a computing system or other communications device communicatively coupled to the conference management module (126). The invitee system (206) may send a request to the conference management module (126) that includes an identifier of the conference the invitee system (206) is requesting to join, and an identifier that identifies or describes the person or entity operating the invitee system (206) requesting access to a conference hosted by the conference management module (126). The identifier may be, for example, a phone number, a user name, an internet address, an email address, or a conference access code. Once permission to join a conference is granted to the invitee system (206), that invitee system becomes a participant system.

The conference management module (126) is logic executing on a computing system that hosts the conference for the participant systems (participant system A (202A), participant system N (202N)). The conference management module (126) also determines which invitee systems (e.g., invitee system (206)) to grant permission to join, or deny access to join, a conference in progress. A conference is a real-time communication exchange between the people or entities operation the participant systems (participant system A (202A), participant system N (202N)). The conference includes audio received from one participant system and transmitted, by the conference management module (126), to each other participant system.

The audio extraction module (208) is logic within the conference management module (126) capable of converting audio to data describing the conference. The audio extraction module (208) may transcribe the audio exchanged between the participant systems (participant system A (202A), participant system N (202N)) into text or other data readable by a computing system. The audio extraction module (208) may access other computing systems to aid in the conversion and transcription. For example, the audio extraction module (208) may take an audio file or a portion of the audio file taken from the audio of the conference in progress and transmit that file to a remote computing system for language recognition and conversion to text or data.

The context repository (204) is a collection of contexts. The context repository (204) may be a location in computer storage searchable by the conference management module. A context may include a calendar event file, an invitation file, a subject matter, a list of authorized participants, and/or a set of rules.

Figure 3:
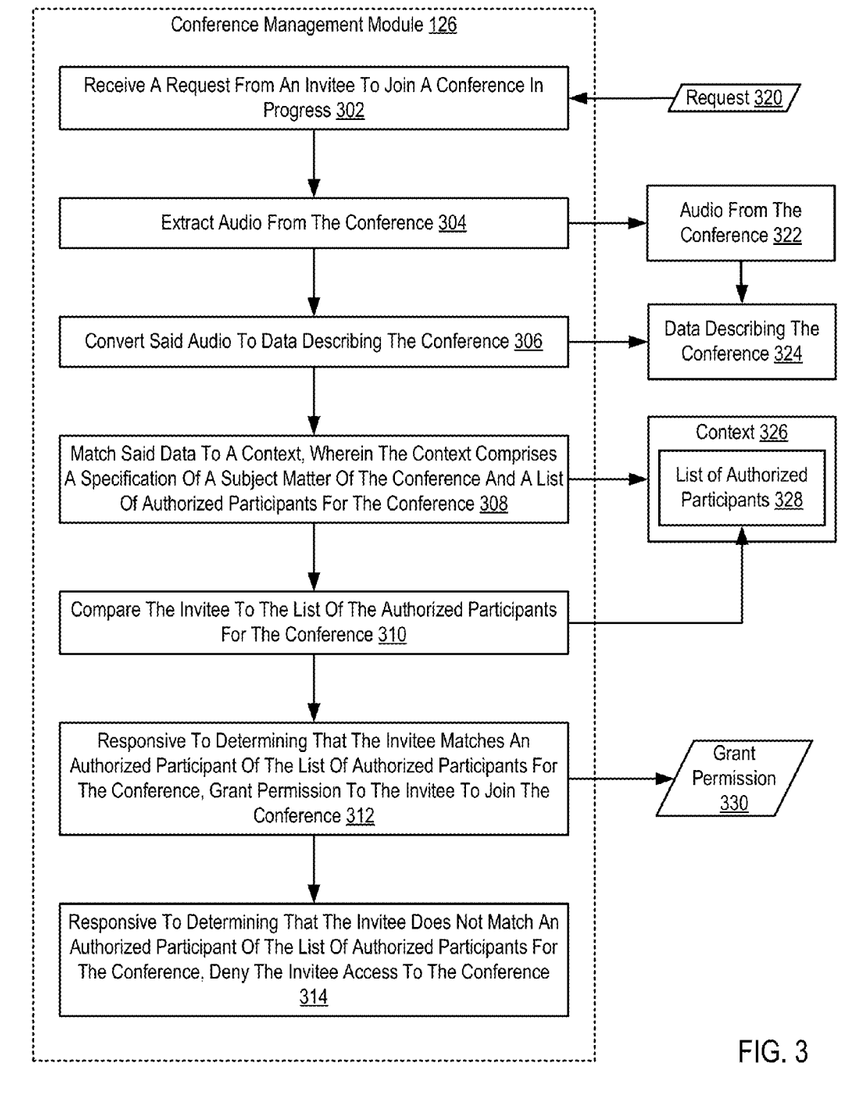
FIG. 3 sets forth a flow chart illustrating an exemplary method for using a conversation context to manage conference participants according to embodiments of the present invention.

For further explanation, FIG. 3 sets forth a flow chart illustrating an exemplary method for using a conversation context to manage conference participants according to embodiments of the present invention. The method of FIG. 3 includes receiving (302) a request (320) from an invitee to join a conference in progress. Receiving (302) a request (320) from an invitee to join a conference in progress may be carried out by an invitee system transmitting a request (320) that includes an invitee identifier to the conference management module (126).

For example, an invitee may use a phone to dial a phone number to join a conference hosted by the conference management module (126). When prompted, the invitee may, via the phone, input a conference access code that identifies the conference, and a pin that identifies the invitee. The conference management module (126) may then receive the request that includes the access code and the pin.

As another example, an invitee may navigate to a webpage using an invitee computing system. The website address may include an identifier of the conference and may prompt the user to enter an identifier for the invitee. The invitee, via the invitee computing system, may enter a user name. The conference management module (126) may then receive the request that includes the user name directed at the target conference.

The invitee identifier may specifically identify the invitee or may identify a group to which the invitee belongs. For example, the invitee identifier may identify the invitee as an outside vender, a member of the board of trustees, an employee working in the software development department, etc.

The method of FIG. 3 also includes extracting (304) audio from the conference (322). Extracting (304) audio from the conference (322) may be carried out by recording the audio from all or a portion of the conference. The audio extracted from the conference may include audio from each of the participating systems that contributed audio to the conference. The audio from the conference (322) may be recorded starting with the beginning of the conference or from another point during the conference. For example, the conference management module (126) may detect extended audio lapses during the conference, and start or restart recording once the audio begins again.

Extracting (304) audio from the conference (322) may be performed in response to receiving the request from the invitee. Alternatively, extracting (304) audio from the conference (322) may be performed continually or periodically in order to maintain up-to-date knowledge of the current conference context.

The method of FIG. 3 also includes converting (306) said audio (322) to data describing the conference (324). Converting (306) said audio (322) to data describing the conference (324) may be carried out by transcribing the audio from the conference (322) using voice recognition algorithms. Converting (306) said audio (322) to data describing the conference (324) may be carried out using an audio extraction module. Such an audio extraction module may be executing on the same computing system as the conference management module (126).

The conference management module (126) may convert the audio from the conference (322) to data describing the conference (324) by adding additional terms to the text transcribed from the audio. For example, the conference management module (126) may add common synonyms of the words spoken to the data describing the conference (324) in order to maximize the accuracy of a match to a context.

The method of FIG. 3 also includes matching (308) data to a context (326), wherein the context comprises a specification of a subject matter of the conference and a list of authorized participants (328) for the conference. Matching (308) data to a context (326), wherein the context comprises a specification of a subject matter of the conference and a list of authorized participants (328) for the conference may be carried out by searching a context repository for a context that includes terms that match the data describing the conference (324).

For example, audio from the conference (322) may include a discussion of performance and current compensation of a specific employee of a company. This audio may be converted into data describing the conference (324) that includes the text of the conversion along with terms such as "raise", "annual review", and "bonus". The terms within the data describing the conference (324) may then be compared to terms within each context in a group of contexts. In this example, the group of contexts in the context repository may include calendar event files and meeting invitation files. A matching calendar event file or meeting invitation file may include a text description of the subject matter (e.g., titled "who to give raises to this year") or attachments (e.g. a presentation file for employees in consideration for a raise). The context may include a list of authorized participants (328) that includes two vice presidents and the head of human resources.

The context may also include a scheduled time for the conference, and that time may not match the current time of the conference in progress. For example, a calendar event file may include a subject matter for discussion and a time for the conference. That conference may run long, and the subject matter may continue to be discussed in the conference outside of the time designated for the conference in the calendar event file.

The method of FIG. 3 also includes comparing (310) the invitee to the list of the authorized participants (328) for the conference. Comparing (310) the invitee to the list of the authorized participants (328) for the conference may be carried out by determining whether the identifier for the invitee matches any identifiers for authorized participants in the list of authorized participants (328) for the context.

The list of the authorized participants (328) may include a rule set to determine whether the invitee is granted permission to join the conference. The list of the authorized participants (328) may include a type of authorized participant. For example, the list of the authorized participants (328) may state that any employee ranked vice president or higher may join the conference. As another example, the list of the authorized participants (328) may state that any employee of the accounting department may join the conference. The invitee may alternatively or additionally be associated with a profile. The invitee identifier may be used to determine a profile for the invitee, and the profile may be used by the conference management module (126) to compare to the context and/or the list of the authorized participants (328).

The method of FIG. 3 also includes responsive to determining that the invitee matches an authorized participant of the list of authorized participants for the conference, granting (312) permission (330) to the invitee to join the conference. Granting (312) permission (330) to the invitee to join the conference may be carried out by adding the invitee to the conference by transitioning an invitee system to a participant system. Granting (312) permission (330) to the invitee to join the conference may be carried out by notifying the invitee and the current conference participants that the invitee has joined the conference.

Granting (312) permission (330) to the invitee to join the conference may also include issuing a warning to the other participants if the invitee matches a certain class of authorized participants. For example, the conference management module (126) may determine that the context of a conference in progress is outside venders, and the list of authorized participants (328) may have a class of participants (e.g., outside venders) which are allowed to join the conference but only after each other authorized participant has been warned that the conference now includes an outside vendor.

The method of FIG. 3 also includes responsive to determining that the invitee does not match an authorized participant of the list of authorized participants for the conference, denying (314) the invitee access to the conference. Denying (314) the invitee access to the conference may be carried out by informing the invitee that they are not permitted to join the conference. Denying (314) the invitee access to the conference may trigger a notification to one or more of the participants of the conference that the invitee was denied access.

For example, two conferences may be schedule back-to-back with similar participants between the two conferences. The first conference may be to discuss bids received from different original equipment manufacturers (OEMs). The second conference may be to meet with one of the OEMs to discuss their bid. The first conference may run long, and if the OEM representative is allowed to join the conference at the designated time, that representative may hear information that would give her an advantage over other OEMs.

In this example, the OEM representative may request to join the conference in progress. The conference management module (126) may extract audio from the conference and convert the audio into data describing the conference. That data describing the conference may include terms such as "bid" "highest" "most reliable" and the names of the other OEMs. The data describing the conference may be matched to a calendar event file that lists a time that has passed, and includes a list of authorized participants (328) that excludes the OEM representative. The conference management module (126) may then compare the invitee identifier for the OEM representative to the list of authorized participants (328) and determine that the OEM representative does not match the list of authorized participants (328). Based on that determination, the conference management module (126) denies the OEM representative access to the conference.

Figure 4:
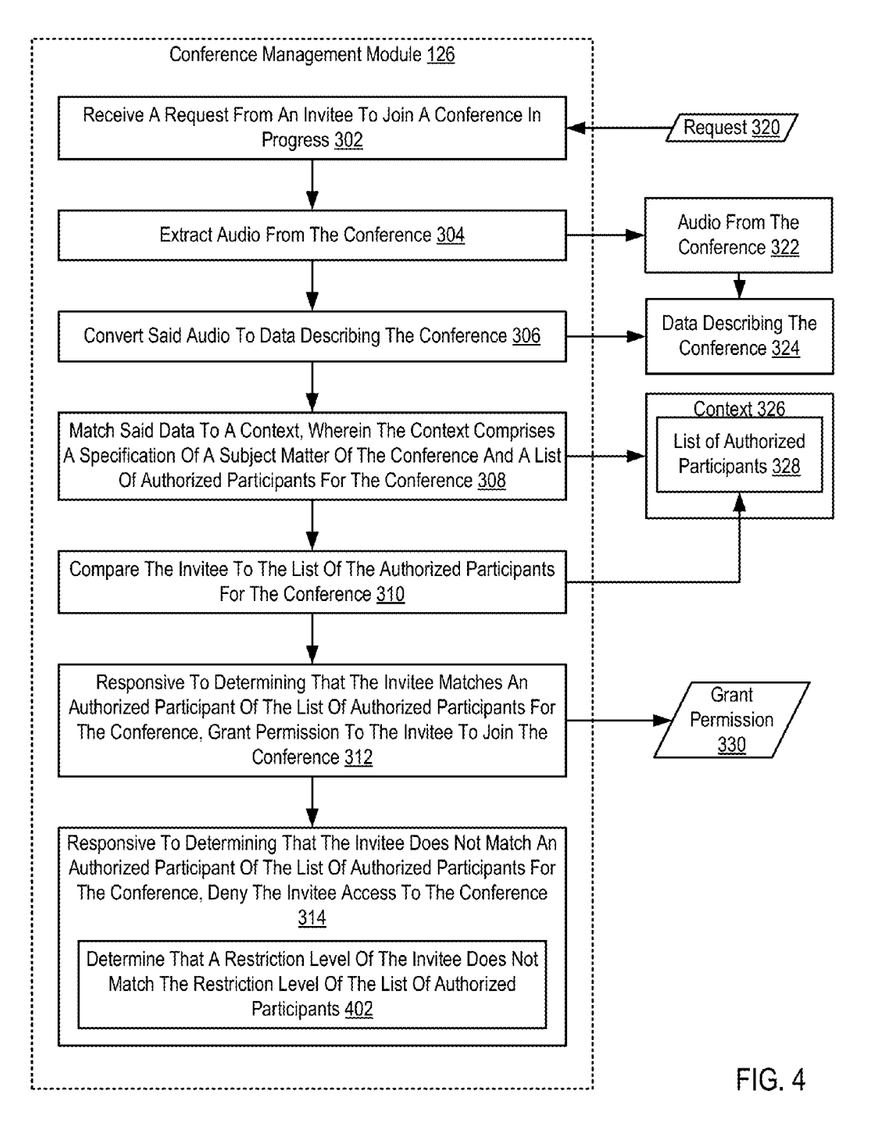
FIG. 4 sets forth a flow chart illustrating an exemplary method for using a conversation context to manage conference participants according to embodiments of the present invention.

For further explanation, FIG. 4 sets forth a flow chart illustrating an exemplary method for using a conversation context to manage conference participants according to embodiments of the present invention that includes receiving (302) a request (320) from an invitee to join a conference in progress; extracting (304) audio from the conference (322); converting (306) said audio (322) to data describing the conference (324); matching (308) data to a context (326), wherein the context comprises a specification of a subject matter of the conference and a list of authorized participants (328) for the conference; comparing (310) the invitee to the list of the authorized participants (328) for the conference; responsive to determining that the invitee matches an authorized participant of the list of authorized participants for the conference, granting (312) permission (330) to the invitee to join the conference; and responsive to determining that the invitee does not match an authorized participant of the list of authorized participants for the conference, denying (314) the invitee access to the conference.

The method of FIG. 4 differs from the method of FIG. 3, however, in that denying (314) the invitee access to the conference includes determining (402) that a restriction level of the invitee does not match the restriction level of the list of authorized participants (328). The list of authorized participants (328) may include a restriction level. A restriction level of the list of authorized participants (328) indicates a minimum status required for participation in a conference. For example, a restriction level of the list of authorized participants (328) may be a minimum rank within an organization, a minimum employment status with a company, or a minimum qualification (e.g., academic degree, certification, etc.).

Determining (402) that a restriction level of the invitee does not match the restriction level of the list of authorized participants (328) may be carried out by determining the restriction level of the invitee using the invitee identifier. The invitee identifier may indicate a restriction level of the invitee, and that restriction level may be compared to the restriction level of the list of authorized participants (328).

Figure 5:
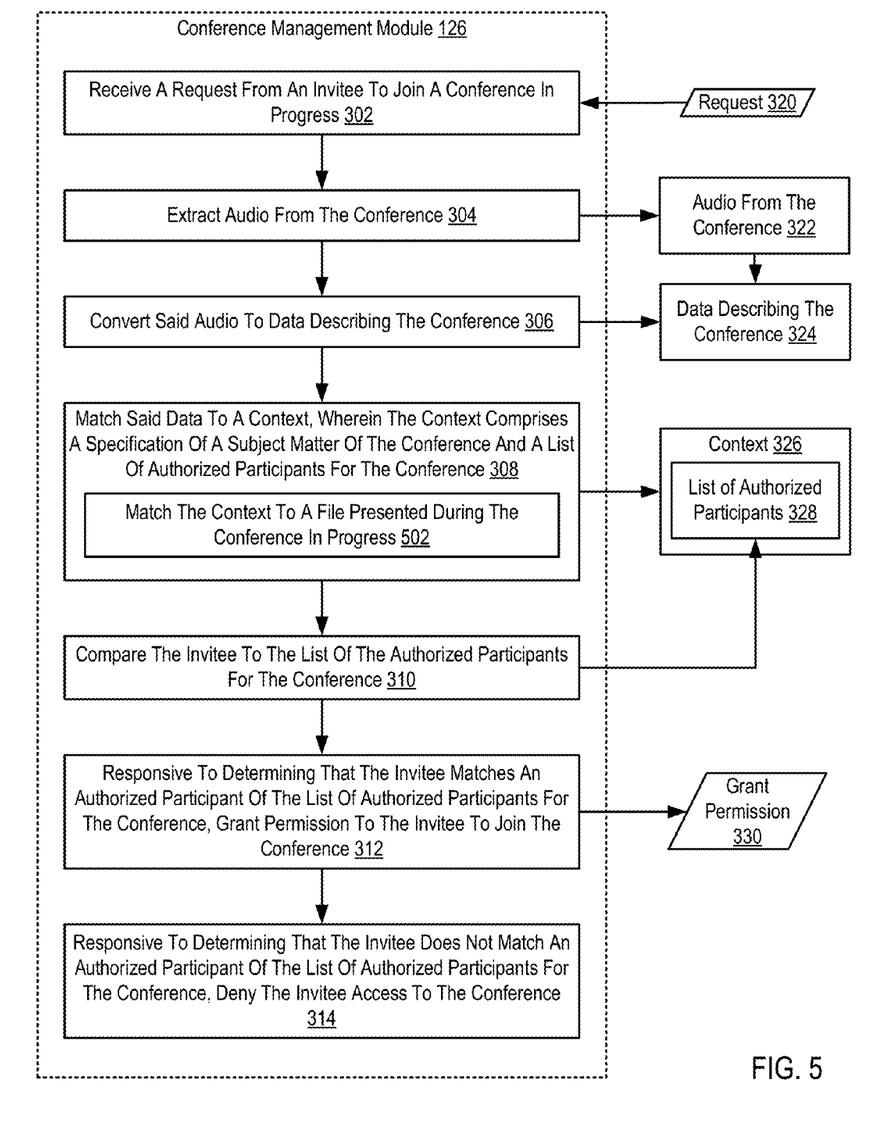
FIG. 5 sets forth a flow chart illustrating an exemplary method for using a conversation context to manage conference participants according to embodiments of the present invention.

For further explanation, FIG. 5 sets forth a flow chart illustrating an exemplary method for using a conversation context to manage conference participants according to embodiments of the present invention that includes receiving (302) a request (320) from an invitee to join a conference in progress; extracting (304) audio from the conference (322); converting (306) said audio (322) to data describing the conference (324); matching (308) data to a context (326), wherein the context comprises a specification of a subject matter of the conference and a list of authorized participants (328) for the conference; comparing (310) the invitee to the list of the authorized participants (328) for the conference; responsive to determining that the invitee matches an authorized participant of the list of authorized participants for the conference, granting (312) permission (330) to the invitee to join the conference; and responsive to determining that the invitee does not match an authorized participant of the list of authorized participants for the conference, denying (314) the invitee access to the conference.

The method of FIG. 5 differs from the method of FIG. 3, however, in that matching (308) data to a context (326), wherein the context comprises a specification of a subject matter of the conference and a list of authorized participants (328) for the conference includes matching (502) the context (326) to a file presented during the conference in progress. Matching (502) the context (326) to a file presented during the conference in progress may be carried out by comparing the context to data describing the conference (324) that includes terms extracted from a file presented during the conference in progress.

For example, a conference may include a visual presentation. During the conference, one of the participants presents a graph comparing the performance of different employees being considered for a raise. The conference management module (126) may extract the employee names from within the graph and add those names as terms in the data describing the conference (324). The employee names may then be used to match the data describing the conference (324) to a context, such as a conference invitation file that includes a subject matter describing employee evaluations.

Figure 6:
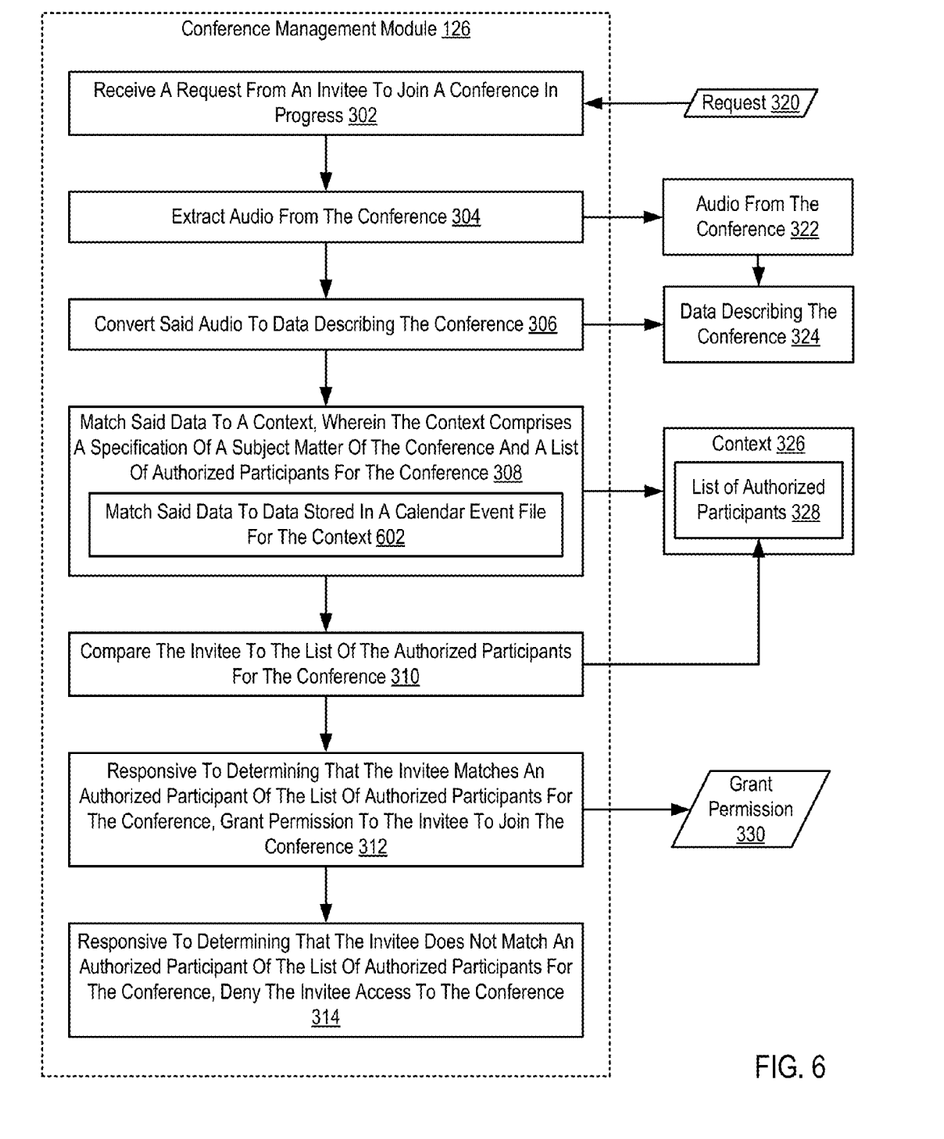
FIG. 6 sets forth a flow chart illustrating an exemplary method for using a conversation context to manage conference participants according to embodiments of the present invention.

For further explanation, FIG. 6 sets forth a flow chart illustrating an exemplary method for using a conversation context to manage conference participants according to embodiments of the present invention that includes receiving (302) a request (320) from an invitee to join a conference in progress; extracting (304) audio from the conference (322); converting (306) said audio (322) to data describing the conference (324); matching (308) data to a context (326), wherein the context comprises a specification of a subject matter of the conference and a list of authorized participants (328) for the conference; comparing (310) the invitee to the list of the authorized participants (328) for the conference; responsive to determining that the invitee matches an authorized participant of the list of authorized participants for the conference, granting (312) permission (330) to the invitee to join the conference; and responsive to determining that the invitee does not match an authorized participant of the list of authorized participants for the conference, denying (314) the invitee access to the conference.

The method of FIG. 6 differs from the method of FIG. 3, however, in that matching (308) data to a context (326), wherein the context comprises a specification of a subject matter of the conference and a list of authorized participants (328) for the conference includes matching (602) said data to data stored in a calendar event file for the context (326). Matching (602) said data to data stored in a calendar event file for the context (326) may be carried out by comparing the data describing the conference (324) to a group of calendar event files. The calendar event files may include data such as a description of the subject matter of the event and attached files for presentation during the event. The data describing the conference (324) may be compared to the terms used in the data stored in each calendar event file to determine a match.

Figure 7:
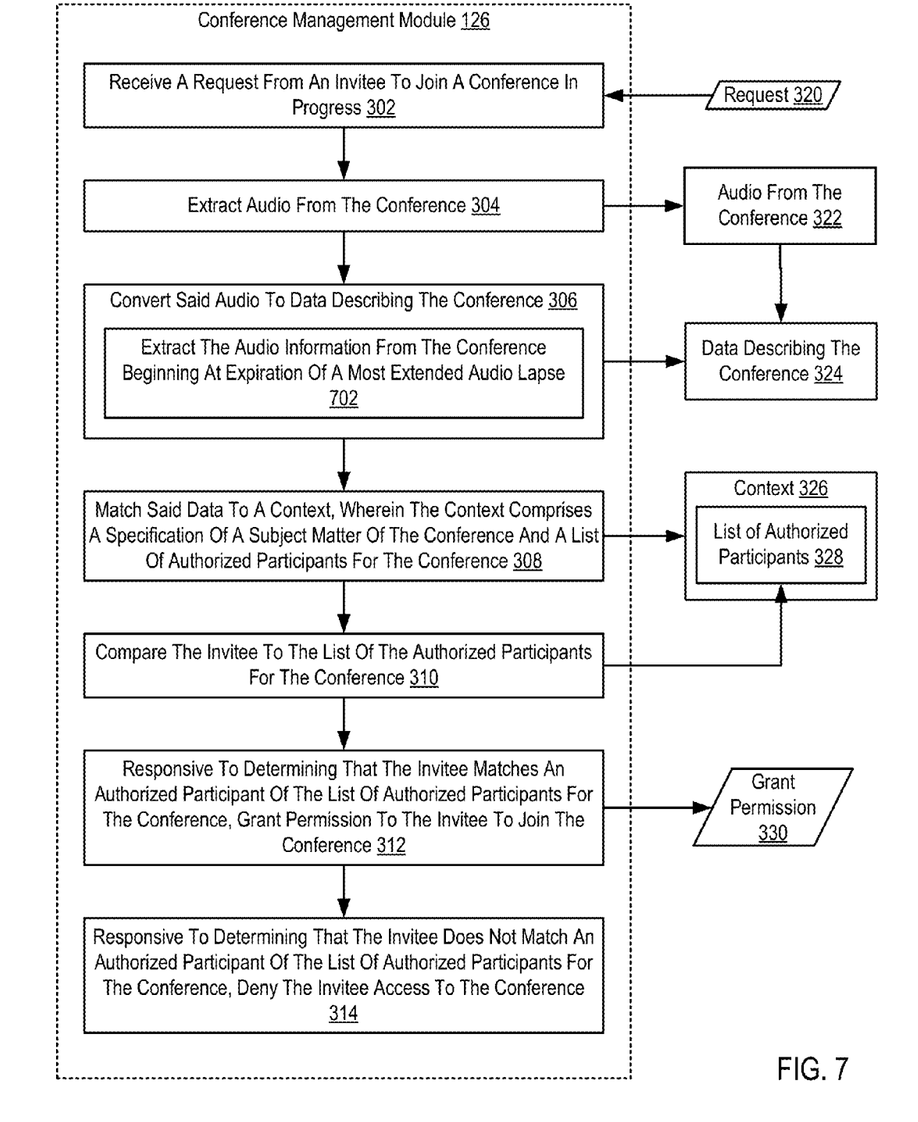
FIG. 7 sets forth a flow chart illustrating an exemplary method for using a conversation context to manage conference participants according to embodiments of the present invention.

For further explanation, FIG. 7 sets forth a flow chart illustrating an exemplary method for using a conversation context to manage conference participants according to embodiments of the present invention that includes receiving (302) a request (320) from an invitee to join a conference in progress; extracting (304) audio from the conference (322); converting (306) said audio (322) to data describing the conference (324); matching (308) data to a context (326), wherein the context comprises a specification of a subject matter of the conference and a list of authorized participants (328) for the conference; comparing (310) the invitee to the list of the authorized participants (328) for the conference; responsive to determining that the invitee matches an authorized participant of the list of authorized participants for the conference, granting (312) permission (330) to the invitee to join the conference; and responsive to determining that the invitee does not match an authorized participant of the list of authorized participants for the conference, denying (314) the invitee access to the conference.

The method of FIG. 7 differs from the method of FIG. 3, however, in that converting (306) said audio (322) to data describing the conference (324) includes extracting (702) the audio information from the conference beginning at expiration of a most extended audio lapse. Extracting (702) the audio information from the conference beginning at expiration of a most extended audio lapse may be carried out by measuring each audio lapse and comparing the audio lapse to a threshold or other recent audio lapses.

For example, participants in one conference may conclude discussion of a previous subject matter and begin waiting for other participants to arrive for a subsequent conference. During this waiting period, there may be an extended audio lapse. The conversion of the audio from the conference may include extracting only the audio information beginning at the audio lapse, which may indicate the end of one conference and the beginning of another.

In view of the explanations set forth above, readers will recognize that the benefits of using a conversation context to manage conference participants according to embodiments of the present invention include:
  Improving the operation of a computer system by using a conversation context to manage conference participants increasing computer system functionality.
  Improving the operation of a computer system by creating a correlation between the audio of a conference and context that includes a subject matter and list of authorized participants.

Exemplary embodiments of the present invention are described largely in the context of a fully functional computer system for using a conversation context to manage conference participants. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method comprising:
by first computing instructions executed by a computing system:
receiving a request from an invitee to join a conference in progress;
extracting audio from the conference in progress, the audio including at least a portion of the conference in progress;
converting said audio to data describing the conference including transcribing the at least a portion of the conference in progress;
matching the data to a context, wherein the context comprises a specification of a subject matter of the conference and a list of authorized participants for the conference;
comparing the invitee to the list of the authorized participants for the conference;
responsive to determining that the invitee matches an authorized participant of the list of authorized participants for the conference, granting permission to the invitee to join the conference; and
responsive to determining that the invitee does not match an authorized participant of the list of authorized participants for the conference, denying the invitee access to the conference.

2. The method of claim 1, wherein the context comprises a calendar event.

3. The method of claim 2, wherein a scheduled time of the calendar event does not match a time of the conference in progress.

4. The method of claim 1, wherein the list of authorized participants comprises a restriction level, and wherein determining that the invitee does not match an authorized participant of the list of authorized participants for the conference comprises determining that a restriction level of the invitee does not match the restriction level of the list of authorized participants.

5. The method of claim 1, wherein matching said data to a context further comprises matching the context to a file presented during the conference in progress.

6. The method of claim 1, wherein matching said data to a context further comprises matching said data to data stored in a calendar event file for the context.

7. The method of claim 1, wherein converting said audio to data describing the conference further comprises extracting the audio information from the conference beginning at expiration of a most extended audio lapse.

8. An apparatus comprising a computing device, a computer processor, and a computer memory operatively coupled to the computer processor, the computer memory having disposed within it computer program instructions that, when executed by the computer processor, cause the apparatus to carry out the steps of:
receiving a request from an invitee to join a conference in progress;
extracting audio from the conference in progress, the audio including at least a portion of the conference in progress;
converting said audio to data describing the conference including transcribing the at least a portion of the conference in progress;
matching the data to a context, wherein the context comprises a specification of a subject matter of the conference and a list of authorized participants for the conference;
comparing the invitee to the list of the authorized participants for the conference;
responsive to determining that the invitee matches an authorized participant of the list of authorized participants for the conference, granting permission to the invitee to join the conference; and
responsive to determining that the invitee does not match an authorized participant of the list of authorized participants for the conference, denying the invitee access to the conference.

9. The apparatus of claim 8, wherein the context comprises a calendar event.

10. The apparatus of claim 9, wherein a scheduled time of the calendar event does not match a time of the conference in progress.

11. The apparatus of claim 8, wherein the list of authorized participants comprises a restriction level, and wherein determining that the invitee does not match an authorized participant of the list of authorized participants for the conference comprises determining that a restriction level of the invitee does not match the restriction level of the list of authorized participants.

12. The apparatus of claim 8, wherein matching said data to a context further comprises matching the context to a file presented during the conference in progress.

13. The apparatus of claim 8, wherein matching said data to a context further comprises matching said data to data stored in a calendar event file for the context.

14. The apparatus of claim 8, wherein converting said audio to data describing the conference further comprises extracting the audio information from the conference beginning at expiration of a most extended audio lapse.

15. A computer program product including a non-transitory computer readable medium, the computer program product comprising computer program instructions that, when executed, cause a computer to carry out the steps of:

receiving a request from an invitee to join a conference in progress;

extracting audio from the conference in progress, the audio including at least a portion of the conference in progress;

converting said audio to data describing the conference including transcribing the at least a portion of the conference in progress;

matching the data to a context, wherein the context comprises a specification of a subject matter of the conference and a list of authorized participants for the conference;

comparing the invitee to the list of the authorized participants for the conference;

responsive to determining that the invitee matches an authorized participant of the list of authorized participants for the conference, granting permission to the invitee to join the conference; and responsive to determining that the invitee does not match an authorized participant of the list of authorized participants for the conference, denying the invitee access to the conference.

16. The computer program product of claim 15, wherein the context comprises a calendar event.

17. The computer program product of claim 16, wherein a scheduled time of the calendar event does not match a time of the conference in progress.

18. The computer program product of claim 15, wherein the list of authorized participants comprises a restriction level, and wherein determining that the invitee does not match an authorized participant of the list of authorized participants for the conference comprises determining that a restriction level of the invitee does not match the restriction level of the list of authorized participants.

19. The computer program product of claim 15, wherein matching said data to a context further comprises matching the context to a file presented during the conference in progress.

20. The computer program product of claim 15, wherein matching said data to a context further comprises matching said data to data stored in a calendar event file for the context.

* * * * *